Sept. 3, 1963 G. T. HEMMETER 3,102,325
RASP BLADE CONSTRUCTION
Filed Jan. 11, 1960
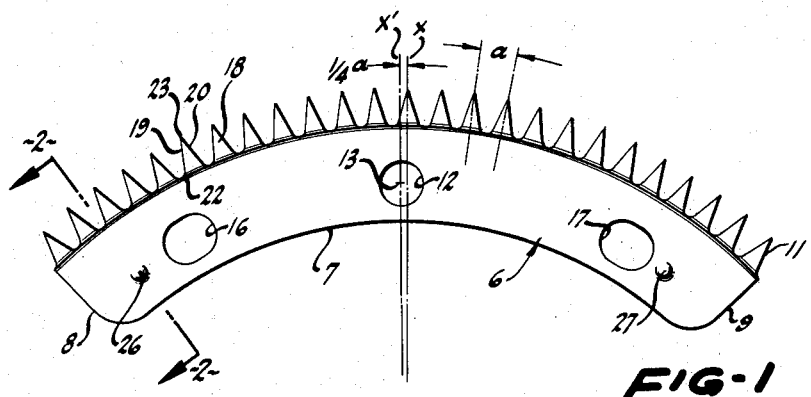
FIG-1
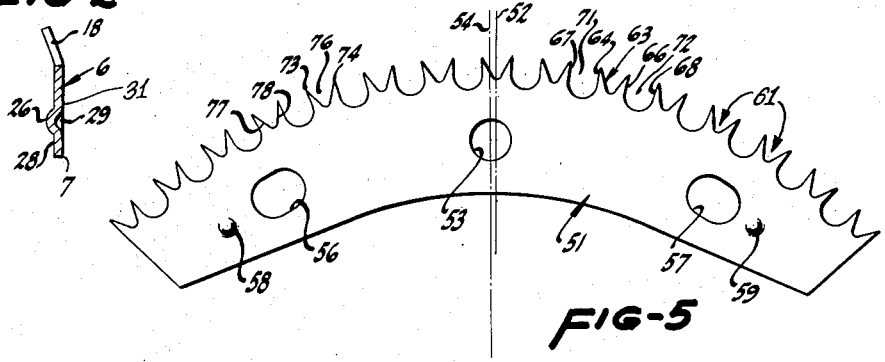
FIG-2
FIG-5
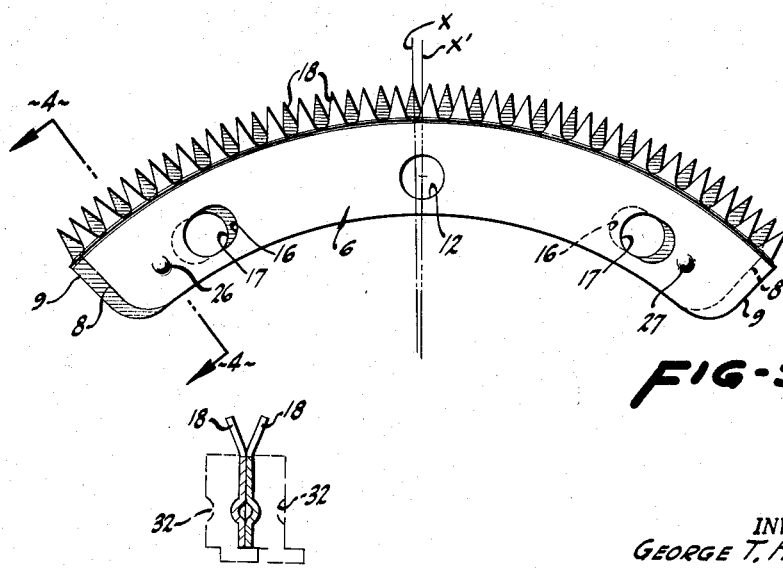
FIG-3
FIG-4
INVENTOR.
GEORGE T. HEMMETER
BY Lothrop & West
ATTORNEYS United States Patent Office 3,102,325
Patented Sept. 3, 1963

3,102,325
RASP BLADE CONSTRUCTION
George T. Hemmeter, Los Altos, Calif., assignor to
Alton E. Tobey, Santa Cruz, Calif.
Filed Jan. 11, 1960, Ser. No. 1,675
6 Claims. (Cl. 29—79)

My invention relates to devices for removing materials from the body to which they are attached and is especially concerned with the removing element utilized in connection with a device for detaching tread rubber from a tire casing; for example, an automobile tire casing. A mechanism for this general purpose is shown in my copending application entitled Hub, Serial No. 1,597, filed January 11, 1960.

In preparing worn tire casings for further service, it is customary to remove much of the residual tread rubber to afford a freshly exposed, uniformly contoured surface and then to recap or recover that surface with freshly applied and vulcanized rubber. It is also customary to remove the unwaned tread rubber by means of a tack buffer or rasp. This ordinarily is a revolving member such as a drum having a number of projections like tacks or like rasp teeth projecting therefrom. Protracted use of such an implement produces dulling of the tacks or of the teeth, rendering the device of little further utility. An improved structure for this purpose is shown in my copending application and involves the use of teeth for engagement with and removal of the rubber. These teeth also are subject to wear and dulling.

It is therefore an object of my invention to provide a construction of toothed blade especially for use in the before-mentioned structure and one which actually cuts, as it buffs, as it resharpens itself.

Another object of my invention is to provide a blade having teeth thereon which can be quickly and accurately positioned for use and which can as quickly be removed when dulled.

An additional object of the invention is to provide a rasp blade of such construction as to provide a large number of beneficially located teeth in order to perform the rubber removal smoothly and to leave a smooth remaining surface.

An additional object of the invention is to provide a rasp blade construction having the attributes as to location and juxtaposition of the effective points of a tack buffer while being much easier and simpler to manufacture and more readily handled.

A still further object of the invention is to provide a rasp blade construction in which the blade can be quite accurately positioned in its mounting and with respect to adjacent similar blades.

A still further object of the invention is to provide a blade which will not hog in while cutting.

A still further object of the invention is to provide a mounting system which will permit staggered relation of teeth when mounted dually for optimum performance.

A still further object of the invention is to provide a rasp blade construction which can easily and simply be economically fabricated and used.

Other objects of the invention, together with the foregoing, are attained in the embodiment of the invention described in the accompanying description and illustrated in the accompanying drawings, in which:

FIGURE 1 is an elevation of the rasp blade constructed according to the invention;

FIGURE 2 is a cross-section, the plane of which is indicated by the line 2—2 of FIGURE 1;

FIGURE 3 is a view similar to FIGURE 1 but showing two rasp blades constructed in accordance with the invention and juxtaposed for service;

FIGURE 4 is a cross-section, the plane of which is indicated by the line 4—4 of FIGURE 3 and showing in dotted lines a fragment of the normally used supporting drum; and FIGURE 5 is a view similar to FIGURE 1 but showing a modified form of blade construction.

In an exemplary and preferred form of the invention, as shown in FIGURES 1–4, there is provided a blank 6 having the general configuration of a segment, that is, any desired fractional part of an annulus; for example, substantially a quadrant of an annulus, being in part defined by an inner arcuate edge 7, radial end edges 8 and 9 and a serrated outer edge 11. The blank 6 is initially a piece of planar metal stock of uniform thickness and is conveniently of steel which can be properly tempered. Adjacent its center, but not exactly equidistant from the end edges 8 and 9, the blank 6 is pierced by a mounting aperture 12 of circular configuration located with its center 13 on a radial line $x^1$ to one side of the center line $x$ of the blank annulus. On opposite sides of the aperture 12, the blank 6 is also provided with apertures 16 and 17 equally spaced from the radial line X and elongated in a circumferential direction.

The serrated periphery 11 of the blank is made up of a number of teeth 18. In this instance, all of the teeth are symmetrical with respect to the radial center line $x$ and are of similar contour. Each tooth is bounded by one inclined side 19 and another inclined side 20, the adjacent portions of adjoining teeth merging in an arcuate edge 22. Each tooth thus has an apex 23 that is situated with an angular pitch of "A" degrees from the apex of the adjacent tooth. The center line $x^1$ of the mounting holes is displaced ¼ of "A" degrees from the radial center line $x$ running through the apex of the tooth 18.

Disposed substantially equidistantly from the center line $x^1$ in opposite angular or circumferential directions are two dimpled lugs 26 and 27, or projections, upstanding from one face 28 of the blank 6. Since the thickness of the blank is substantially uniform throughout, there are resulting depressions 29 in the opposite face 31 of the blank. The lugs 26 and 27, as indicated in FIGURE 4, are for interengagement with appropriately disposed receiving recesses 32 in the mounting drum.

For dual mounting the serrated periphery 11 may but need not necessarily be offset from the plane of the plate or blank 6 so that the various teeth 18, in effect, define or coincide with a portion of a conical surface. The teeth 18 are inclined toward the side having the projections 26 and 27, as shown in FIGURE 2.

In the preferred use of the device, a pair of the blanks or blades 6, each exactly as hereinabove described, are placed back-to-back with the surfaces 31 substantially in abutment and with the respective apertures 12 both in alignment on the center line $x^1$. Since the centers 13 of the apertures 12 are not equidistant in each blank from the radial ends 8 and 9, when the centers 13 of the two blanks are juxtaposed or aligned, the ends of one blank are offset with respect to the ends of the other blank, as shown in FIGURE 3. Also, since the centers 13 are each one-fourth the tooth pitch distance offset from the center of the tooth apices 23, the teeth 18 of the back-to-back blanks are evenly interspersed, as seen in FIGURE 3. Because the blanks 6 are placed back-to-back, the serrated tooth margins 11 are directed in opopsite ways from the plane of symmetry, as shown in FIGURE 4, and the lugs 26 and 27 extend outwardly in opposite directions. Blades without tooth set may be operated back-to-back.

With this arrangement, there is provided a simple blank easy and cheap to manufacture which when utilized with an identical blank provides a staggered tooth array, as seen in side elevation, and an offset location symetrical about a central plane, as seen in cross-section or end elevation. The individual blades, having projections 26 and 27, are individually located in a driving engagement on the mounting drum. The stacked blanks can readily receive through bolts for clamping them together and for transmitting driving forces thereto. There is thus provided a substantially improved rasp blade construction which lends itself to improved results in removing the rubber from a tire casing. The articles can economically and readily be fabricated with close quality control and give a large number of differently located teeth easily and readily installed and removed.

In some instances, it is desired to utilize a modified form of rasp blade and for that reason there is illustrated in FIGURE 5 a blade which can be utilized as a replacement or substitute for the blades previously disclosed.

In this instance, there is provided a flat metal blank 51 of slightly under a quadrant annular form generally symetrical about a center line 52. Piercing the blank is an aperture 53 on a radial line 54 offset from the center line 52. On either side of the aperture 53 there are provided additional, elongated apertures 56 and 57. The apertures 53, 56 and 57 are in the same relative locations as the apertures 12, 16 and 17 (FIG. 1). Also, there are provided in the blank dimpled projections 58 and 59 comparable to the projections 26 and 27.

There is a variation, however, in the provision of the twin teeth 61. Symmetrically located with respect to the center line 52 is a typical, central tooth, generally designated 63. The twin tooth is bounded on opposite sides by edges 64 and 66 which are not radial, although they are very nearly so. The edge 64, for example, is parallel to the edge 67 of the nearest adjacent twin tooth whereas the edge 66 is parallel to the edge 68 of its nearest adjacent tooth. Since by construction the indentations 71 and 72 have parallel sides, when the apex of tooth 67 is normal to the surface being rasped, cutting edge 67 has a positive rake angle of ½ "A" degrees. A twin tooth has apices 73 and 74, the material of the blank being cut away to define a re-entrant portion 76 having inclined sides 77 and 78.

As in the case of the conventional blade, twin blades can be used either singly or in pairs, with or without the use of side-set to obtain the desired tooth spacing and subsequently the type of rasped surface produced. When the blades are mounted back-to-back the offset mounting hole insures staggered tooth arangement. If it be desirable that the teeth be further spaced so as to improve cutting and rasping characteristics, the teeth can be offset as shown in FIGURE 2 and FIGURE 4. As a further alternative, the successive teeth on a single blade can be offset in oposite directions so that in end elevation the single blade appears very much like the cross-section of FIGURE 4.

With the twin blade configuration it was found in practice that the blades cut the rubber rather than abrade it as is common with the conventional rasp. Speed of rubber removal is greatly increased. The cutting edge of the tooth attacks the material being rasped with a positive rake angle. Rake angle is defined as that angle formed between the cutting face and a radial line at the point of cutting contact. Until now the conventional rasps have usually employed a negative rake angle. For symmetrical blades having an included angle of 30 degrees between faces the negative rake angle would be 15 degrees. With the twin blade design, the rake angle is positive and is equal to the pitch angle of the teeth divided by 2.

Having a positive rake angle the teeth of the twin blade actually cut the rubber from the surface instead of abrading it. Rubber removal is rapid and the power consumption required to operate the rasp is greatly diminished over that of the conventional unit.

With the twin blade rasp, for any given direction of rotation only one of the two tooth cutter points 73 and 74 is available for cutting at a positive rake angle. The remaining tooth, whichever the case may be, abrades the surface at a negative rake angle, which in this particular blade design is equal to 30 degrees minus the pitch angle divided by 2 or approximately 28½ degrees. Under this condition of operation this tooth while buffing the surface of the tire is itself burnished to a very sharp point. This is effective for use as a leading or cutting apex when the rotational direction of the hub is reversed during the normal course of use.

The apex which is acting as a buffing tooth serves as a guard to prevent the cutting tooth due to its positive rake angle from gouging or tearing the rubber.

An inspection of the rubber cuttings removed from a tire indicates that the weight percentage of long sliver-like rubber fragments is large as compared with the weight of dust or powder produced. This accounts for the rapid rate of rubber removal and the lower power consumption had with this type of blade.

Due to the self sharpening features of this type of rasp, its useful life is greately prolonged with a result in economy of operation. Also due to the great flexibility in using the blades either singly or doubly with or without set, great versatility in the type of finish produced may be obtained without resorting to a wide variety of changes in blade profile. Power consumption during operation is comparatively low; rubber removal rate is high. With the conventional tooth where the included angle of apex of the tooth is 30 degrees, the tooth is dragged over the work with a negative rake angle of 15 degrees producing rubber dust rather than rubber cuttings. Power consumption is high; rubber removal is low.

What is claimed is:

1. A rasp blade construction comprising a pair of like flat blanks each in the shape of a segment of an annulus, integral teeth of a predetermined pitch projecting from the outer periphery of each said blank and disposed to coincide with a conical surface, means defining a mounting aperture in each said blank, the radius of the segment through the center of said aperture being displaced from the apex of an adjacent tooth by one-fourth of said predetermined pitch, and means securing said blanks together in back-to-back relationship with the respective apertures thereof in alignment to thereby provide a staggered tooth array in which the teeth of the respective blanks are evenly interspersed.

2. A rasp blade construction comprising a pair of like flat blanks each in the shape of a segment of an annulus, integral teeth of a predetermined pitch projecting from the outer periphery of each said blank, means defining a mounting aperture in each said blank, the radius of the segment through the center of said aperture being displaced from the apex of an adjacent tooth by one-fourth of said predetermined pitch, and means securing said blanks together in back-to-back relationship with the respective apertures thereof in alignment.

3. A rasp blade construction comprising a pair of of flat rasp blades each having a plurality of teeth arranged along an arcuate path at a predetermined pitch distance therebetween, and having positioning means disposed upon a radius of said path displaced one-quarter said pitch distance from the center line of an adjacent one of said teeth, and means securing said blades together in back-to-back relationship with the positioning means of the respective blades in alignment.

4. A rasp blade construction comprising a pair of flat rasp blades each having a plurality of teeth arranged at a predetermined pitch distance therebetween and the adjacent sides of two teeth being parallel, positioning means carried by each said blade at a radius displaced one-quarter said pitch distance from the center line of an adjacent one of said teeth, and means securing said blades together in back-to-back relationship with the corresponding positioning means of the respective blades in alignment.

5. A rasp blade construction according to claim 2, further defined by the teeth of the respective blanks being inclined toward the outside faces thereof.

6. A rasp blade construction according to claim 4, further defined by the teeth of the respective blades being inclined toward the outside faces thereof.

References Cited in the file of this patent

UNITED STATES PATENTS

| | | |
|---|---|---|
| 239,710 | Boynton | Apr. 5, 1881 |
| 2,587,522 | Pilkington | Feb. 26, 1952 |
| 2,703,446 | Jensen | Mar. 8, 1955 |
| 2,728,546 | De Giers | Dec. 27, 1955 |
| 2,896,309 | Jensen | July 28, 1959 |